(12) United States Patent
Jung

(10) Patent No.: US 9,306,393 B2
(45) Date of Patent: Apr. 5, 2016

(54) BATTERY POWER SUPPLY DEVICE AND METHOD OF CONTROLLING POWER OF THE SAME

(76) Inventor: Eun-Ey Jung, Gyeonggi-do (KR)

( * ) Notice: Subject to any disclaimer, the term of this patent is extended or adjusted under 35 U.S.C. 154(b) by 614 days.

(21) Appl. No.: 13/808,533

(22) PCT Filed: Jun. 27, 2011

(86) PCT No.: PCT/KR2011/004673
§ 371 (c)(1),
(2), (4) Date: Mar. 18, 2013

(87) PCT Pub. No.: WO2012/005464
PCT Pub. Date: Jan. 12, 2012

(65) Prior Publication Data
US 2013/0175860 A1 Jul. 11, 2013

(30) Foreign Application Priority Data

Jul. 5, 2010 (KR) .................. 10-2010-0064475
Jun. 23, 2011 (KR) .................. 10-2011-0061329

(51) Int. Cl.
*H02J 3/00* (2006.01)
*H02J 3/32* (2006.01)

(52) U.S. Cl.
CPC ... *H02J 3/00* (2013.01); *H02J 3/32* (2013.01); *Y10T 307/344* (2015.04)

(58) Field of Classification Search
CPC ....................................................... H02J 3/005
USPC ........................................................... 307/65
See application file for complete search history.

(56) References Cited

U.S. PATENT DOCUMENTS

| 6,118,676 A | 9/2000 | Divan et al. |
| 7,541,696 B2 | 6/2009 | Dawley |
| 2002/0036911 A1 | 3/2002 | Okui |
| 2012/0086269 A1* | 4/2012 | Nakano et al. .................. 307/23 |

FOREIGN PATENT DOCUMENTS

| CN | 101465558 | 6/2009 |
| JP | H05-168160 | 7/1993 |
| JP | H08-251839 | 9/1996 |
| JP | 2000-287458 | 10/2000 |
| JP | 2001-204139 | 7/2001 |
| JP | 2002-315231 | 10/2002 |
| JP | 2007-215274 | 8/2007 |

(Continued)

OTHER PUBLICATIONS

Search Report for Chinese Patent Application No. 201180027791.1, dated Jun. 25, 2014, 2 pages.

(Continued)

*Primary Examiner* — Robert Deberadinis
(74) *Attorney, Agent, or Firm* — Sheridan Ross P.C.

(57) ABSTRACT

A battery power supply device is provided. The battery power supply device includes: an input unit that receives external power; a battery power unit that is connected to the input unit to charge a battery with the external power; a current detection unit that detects a current that is supplied to a load and that provides the current to the battery power unit; and an output unit that provides the external power and battery power from one node to the load and that receives a load current from the battery power unit to adjust output of the battery power.

13 Claims, 4 Drawing Sheets

(56) References Cited

FOREIGN PATENT DOCUMENTS

| | | |
|---|---|---|
| JP | 2010-016996 | 1/2010 |
| KR | 1020050009994 | 1/2005 |
| KR | 10-2009-0110751 A | 10/2009 |
| KR | 1020100012555 | 2/2010 |
| KR | 1020110054189 | 5/2011 |

OTHER PUBLICATIONS

Extended European Search Report for European Patent Application No. 11803750.6 dated Feb. 27, 2014, 6 pages.

International Search Report prepared by the Korean Intellectual Property Office on Mar. 14, 2012, for International Application No. PCT/KR2011/004673.

* cited by examiner

FIG.4

| Time | SW2 | SW3 | Remark |
|---|---|---|---|
| 24:00 - 07:00 | ON | OFF | Battery charge time |
| 07:00 - 24:00 | OFF | ON | Battery discharge time | ured # BATTERY POWER SUPPLY DEVICE AND METHOD OF CONTROLLING POWER OF THE SAME

CROSS REFERENCE TO RELATED APPLICATIONS

This application is a national stage application under 35 U.S.C. 371 and claims the benefit of PCT Application No. PCT/KR2011/004673 having an international filing date of Jun. 27, 2011, which designated the United States, which PCT application claimed the benefit of Korean Patent Application No. 10-2010-0064475 filed Jul. 5, 2010, and Korean Patent Application No. 10-2011-0061329 filed on Jun. 23, 2011, the disclosures of each of which are incorporated herein by reference.

BACKGROUND OF THE INVENTION (a) Field of the Invention

The present invention relates to a battery power supply device and a method of controlling power of the same.

(b) Description of the Related Art

When an overload is applied or all energy that is stored in a battery is spent, a battery power supply device such as a conventional uninterruptable power supply (UPS) converts a power supply source that supplies power to a load from a battery to an external power source.

In this case, when the battery power supply device is connected to the load, the battery power supply device selects and uses power that is supplied to the load from necessary power among battery power and external power using a power static switch such as a static switch.

However, there is a limitation in power that the battery power supply device can supply to the load due to an output limitation of a battery inverter.

Further, a phenomenon in which power that is supplied to the load is instantaneously interrupted may occur for several micro-seconds to several hundred micro-seconds when power is converted by operation of the power static switch. That is, as an instantaneous power failure occurs at a power conversion time point, so a problem of power quality occurs.

Further, by using the power static switch, a circuit is complicated, and the switch is consumption goods and thus it is inconvenient to regularly perform maintenance of the switch.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a battery power supply device and a method of controlling power of the same having advantages of using external power and battery power without using a power static switch.

An exemplary embodiment of the present invention provides a battery power supply device. The battery power supply device includes: an input unit that receives external power; a battery power unit that is connected to the input unit to charge a battery with the external power; a current detection unit that detects a current that is supplied to a load and that provides the current to the battery power unit; and an output unit that provides the external power and battery power from one node to the load and that receives a load current from the battery power unit to adjust an output of the battery power.

Another embodiment of the present invention provides a method of controlling power. The method of controlling power of a battery power supply device that receives supply of input power from an external power source and that charges a battery includes: providing the input power or battery power to a load through one node; detecting a current of the load; calculating consumption power of the load based on the current of the load; and adjusting the battery power to output to the load according to the consumption power.

According to an exemplary embodiment of the present invention, by directly connecting a battery power supply device to an external power source without a power static switch, a circuit can be simplified and cost can be reduced.

Further, by detecting a current that is supplied to a load using a current detection sensor, an output of an inverter is controlled, and thus a battery power supply device provides only a portion of power that the load requires and the external power source supplies the remaining power. Therefore, a problem occurring due to a limitation of an inverter capacity can be solved, and even if an overload is applied, energy that is stored in the battery can be supplied to the load without an instantaneous power failure, and backward flow of battery energy to the external power source can be prevented.

Further, by storing new reproduction energy, such as, particularly, that from sunlight and wind force at a battery, and connecting stored energy to the external power source with a method that can supply and use energy that is stored at the battery regardless of a magnitude of energy that is stored at the battery or capacity of an inverter, a power peak can be effectively managed.

BRIEF DESCRIPTION OF THE DRAWINGS

FIG. 4 is a table illustrating an example of a charge and discharge time table according to an exemplary embodiment of the present invention.

DETAILED DESCRIPTION OF THE EMBODIMENTS

Figure 1:
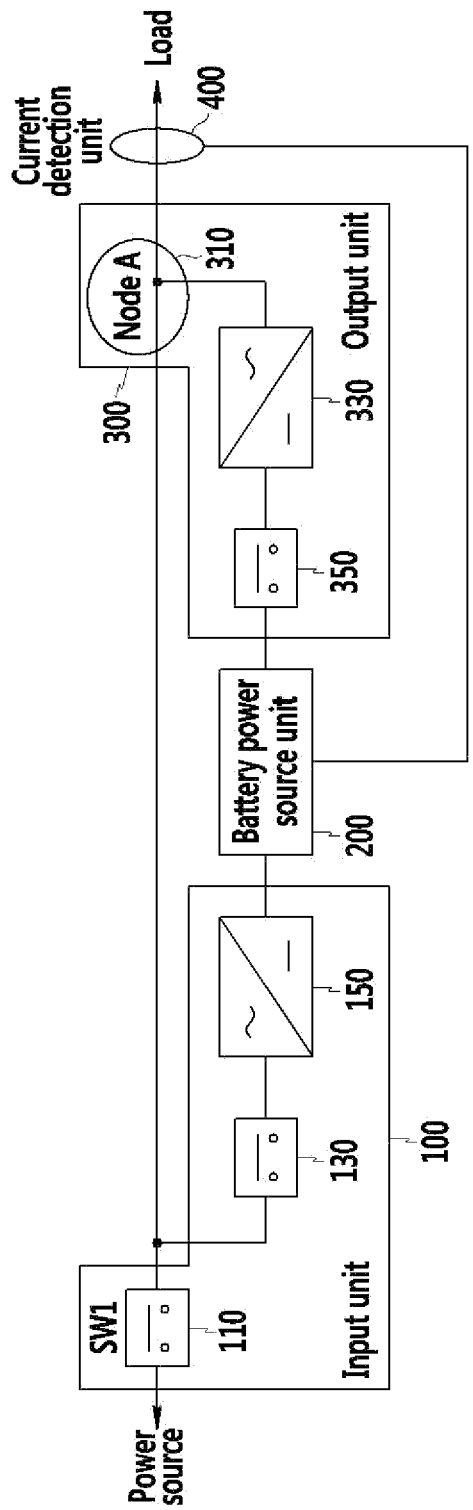
FIG. 1 is a circuit diagram illustrating a battery power supply device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

In addition, the terms "-er", "-or", and "module" described in the specification mean units for processing at least one function and operation and can be implemented by hardware components or software components and combinations thereof.

Hereinafter, a battery power supply device and a method of controlling power of the same according to an exemplary embodiment of the present invention will be described in detail with reference to the drawings.

FIG. 1 is a circuit diagram illustrating a battery power supply device according to an exemplary embodiment of the present invention.

Referring to FIG. 1, the battery power supply device includes an input unit 100, a battery power source unit 200, an output unit 300, and a current detection unit 400.

Here, the input unit 100 receives an input of external power to provide the external power to the battery power source unit 200. Such an input unit 100 includes a first switch (SW1) 110, a second switch (SW2) 130, and an AC/DC converter 150.

In this case, the SW1 110 is connected to an external power source, the

SW2 130 is connected to the SW1 110 and the AC/DC converter 150, and the AC/DC converter 150 is connected to the battery power source unit 200.

Here, when the SW1 110 is turned off, external power is intercepted.

When the SW2 130 is turned on, external power is charged to the battery power source unit 200, and when the SW2 130 is turned off, external power is not charged to the battery power source unit 200. In this way, the SW2 130 is used for controlling charge of a battery of the battery power source unit 200.

The AC/DC converter 150 converts external AC power acquired from the external power source to DC power and provides the DC power to the battery power source unit 200.

Further, the battery power source unit 200 is connected to the AC/DC converter 150 to charge the battery with external power.

In addition, the output unit 300 outputs external power to a load, receives an input of battery power from the battery power source unit 200, and outputs the battery power to the load. Such an output unit 300 includes an output terminal 310, a DC/AC inverter unit 330, and a third switch (SW3) 350.

Here, the output terminal 310 outputs external power that is obtained from the external power source and battery power that is provided by the battery power source unit 200 to the load through a node A.

The DC/AC inverter unit 330 is connected between the battery power source unit 200 and the output terminal 310 to convert DC power that the battery power source unit 200 outputs to AC power and to supply the AC power to the output terminal 310. Further, the DC/AC inverter unit 330 adjusts output of battery power according to a load current that it receives from the current detection unit 400.

The SW3 350 is connected between the battery power source unit 200 and the DC/AC inverter unit 330 to be used for controlling discharge of a battery of the battery power source unit 200.

The current detection unit 400 is connected between the output terminal 310 of the output unit 300 and the load to detect a current that is supplied to the load and to provide the current to the battery power source unit 200.

In this way, when connecting a battery power source to the load, as in the prior art, the battery power source is directly connected between the load and an external power source without using a static switch.

Figure 2:
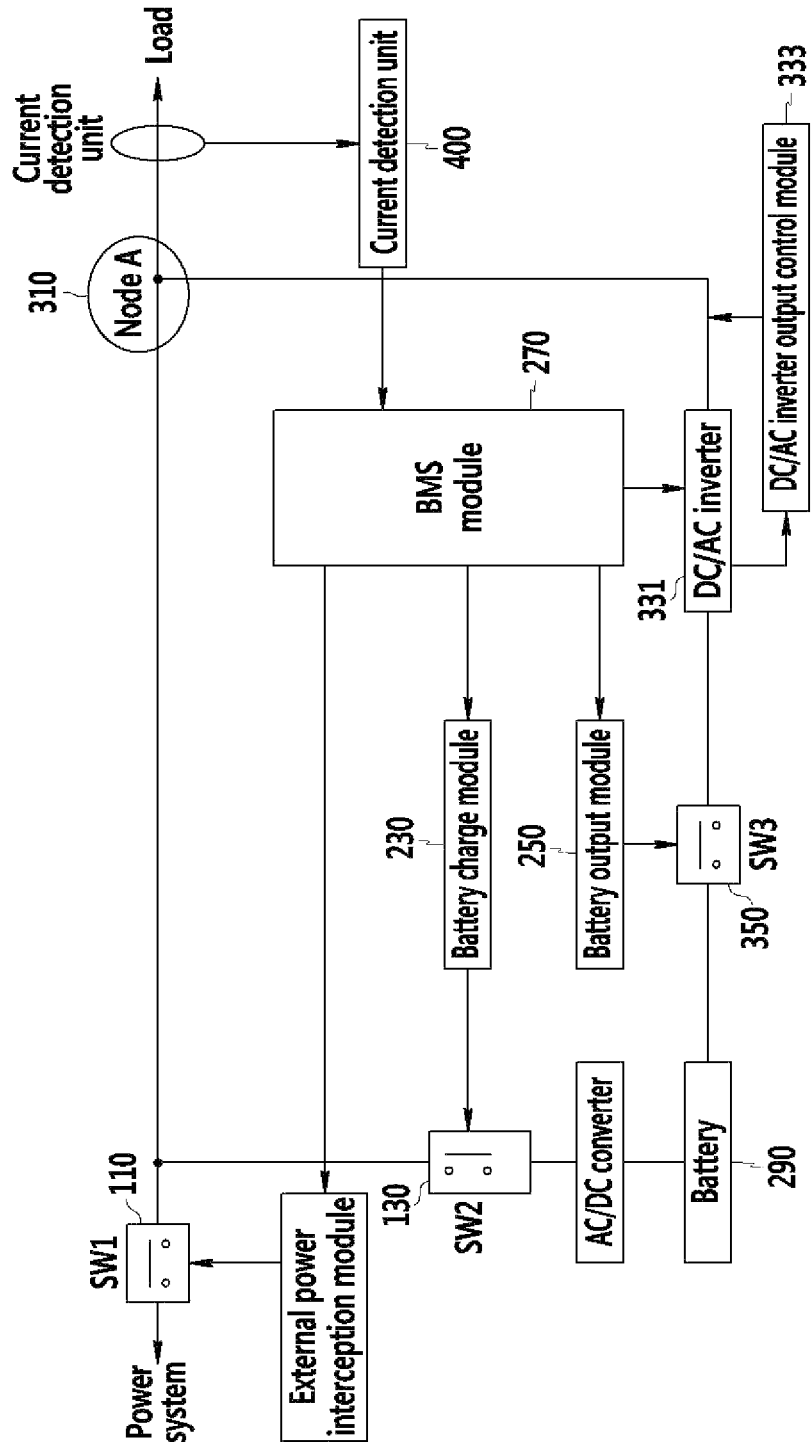
FIG. 2 is a block diagram illustrating a battery power supply device according to an exemplary embodiment of the present invention.

FIG. 2 is a block diagram illustrating a battery power supply device according to an exemplary embodiment of the present invention.

Referring to FIG. 2, the battery power supply device includes an SW1 110, an SW2 130, an AC/DC converter 150, an external power interception module 210, a battery charge module 230, a battery output module 250, a battery management system (BMS) module 270, a battery 290, an output terminal 310, a DC/AC inverter 331, a DC/AC inverter output control module 333, an SW3 350, and a current detection unit 400.

Here, the external power interception module 210 switches the SW1 110.

The battery charge module 230 switches the SW2 130.

The battery output module 250 switches the SW3 350.

The BMS module 270 is a constituent element that manages the battery 290.

The BMS module 270 turns off the SW1 110 through the external power interception module 210 during a power failure, thereby preventing battery power from flowing backward to the external power side.

Further, a switch time of the SW2 130 and the SW3 350 is adjusted by the battery power source unit 200, and the SW2 130 and the SW3 350 are used for adjusting storage and use of battery power.

The BMS module 270 controls on/off of the SW2 130 through the battery charge module 230 to prevent external power from being overcharged to the battery 290. Further, the BMS module 270 controls on/off of the SW3 305 through the battery output module 250 to prevent the battery 290 from being overdischarged.

The BMS module 270 converts the SW2 130 and the SW3 350 to select battery charge power from one of external power and a photovoltaic (PV) battery, and controls to prevent the battery 290 from being overcharged or overdischarged in either case.

Here, the BMS module 270 includes a real time clock (RTC) calendar and enables the present time to be known by a user and outputs the present time to the outside. The BMS module 270 sets and operates a switch time of the SW2 130 and the SW3 350 according to a previously defined time table. In this case, the previously defined time table is a time table that is generated when the user previously inputs a charge time and a discharge time of the battery 290.

The BMS module 270 switches the second switch SW1 130 and the SW3 350 according to the time table, thereby freely adjusting storage and use of battery power. For example, the BMS module 270 charges the battery 290 with external power during the night and converts and uses energy that is stored at the battery 290 to AC using the DC/AC inverter unit 330 during the day, thereby improving an imbalance of power supply.

In this case, a method of protecting the battery 290 from overcharge is not limited to a method of controlling the SW2 130 and the SW3 350, and includes a method of controlling charge of the battery 290 by driving a separate circuit. That is, charge and discharge of a battery may be controlled with another method, for example, when charging the battery 290 with photovoltaic power generation or when external equipment requests power while communicating with the external equipment, charge and discharge of the battery may be performed.

In this case, the BMS module 270 charges the battery 290 with AC external power and supplies battery power to the DC/AC inverter unit 330, as needed, and enables the DC/AC inverter unit 330 to convert DC to AC.

Here, the BMS module 270 detects a load current through the current detection unit 400 and transfers the load current to the DC/AC inverter unit 330.

In this case, the DC/AC inverter unit 330 includes the DC/AC inverter 331 and the DC/AC inverter output control module 333.

The DC/AC inverter 331 converts DC battery power to AC battery power and supplies the AC battery power to the output terminal 310.

In this case, the DC/AC inverter 331 provides the received load current to the DC/AC inverter output control module 333.

The DC/AC inverter output control module 333 controls the DC/AC inverter 331 to control power that is supplied to the load.

Further, the DC/AC inverter output control module 333 enables supply of power that the DC/AC inverter 331 can supply to the load and enables supply of such battery power that is lower than power that the load consumes to the load, thereby preventing battery power from flowing backward to the external power side.

The DC/AC inverter output control module 333 calculates power, i.e., consumption power, that the load uses based on a current that is supplied to the load that the current detection unit 400 detects. The DC/AC inverter output control module 333 controls to supply only power that the DC/AC inverter 331 can supply among consumption power to the load.

In this case, the DC/AC inverter output control module 333 supplies supply power not exceeding about 90% of consumption power of the load.

Here, the reason for supplying the inverter output of less than power that the load requires by about 10% is to prevent the output of the DC/AC inverter 331 from flowing backward to the external power source. When applying Kirchhoff's law to the node A, if output power of less than the load is supplied to the DC/AC inverter 331, it can be seen that output power of the DC/AC inverter 331 cannot flow to the external power source.

As described above, because about 90% of the consumption power of the load is supplied from battery power and the remaining power that the load requires is naturally supplied from the external power source, even if the load suddenly increases, an instantaneous power failure does not occur, as in an existing method.

Further, when supplying battery power to the load with such a method, energy that is stored in the battery can be supplied to the load without interruption regardless of output capacity of the inverter and power that the load can use is not limited due to a limitation of inverter output. Therefore, output capacity of the inverter can be designed to economically optimize output of the inverter without a necessity to consider a rush current and thus the cost of the inverter can be reduced.

Figure 3:
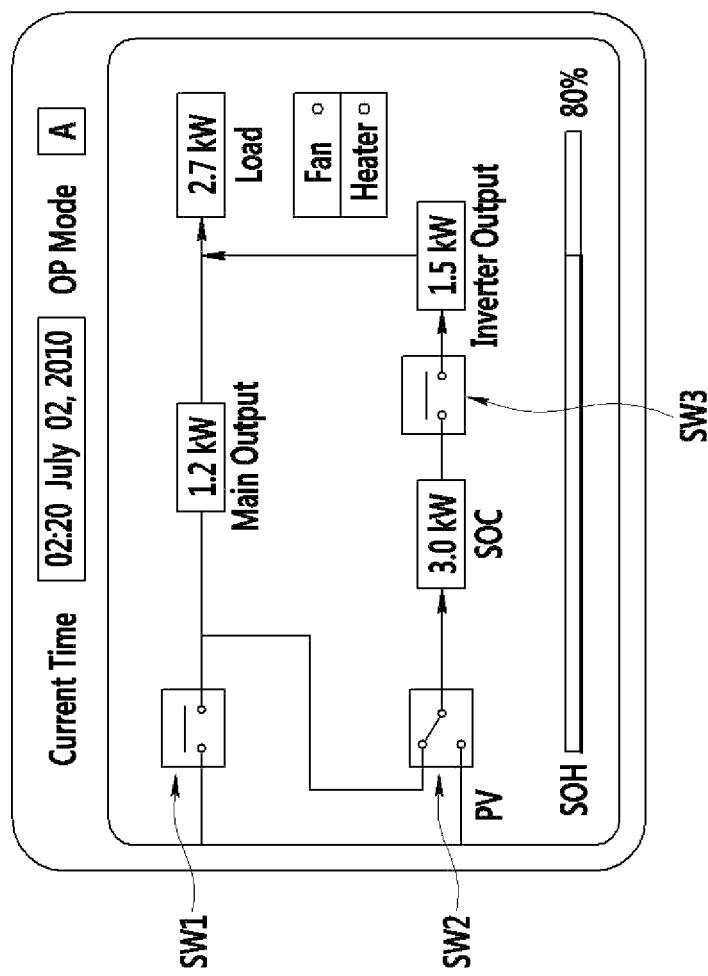
FIG. 3 is a diagram illustrating a liquid crystal display (LCD) according to an exemplary embodiment of the present invention.

FIG. 3 is a diagram illustrating an LCD display according to an exemplary embodiment of the present invention.

Referring to FIG. 3, the BMS (270 of FIG. 2) includes an RTC and represents a present time to the outside, and the present time is represented as 2:20 AM, Jul. 2, 2010.

In this case, a maximum output of the used inverter is 1.5 kW. Here, the inverter is in a state in which it supplies power to a load with a maximum output.

In this case, the load consumes 2.7 kW, a battery power source supplies 1.5 kW thereof, and an external power source supplies the remaining 1.2 kW.

Further, a state of charge (SOC) of 3.0 kWh represents that energy presently stored in the battery is 3.0 kW.

In addition, a state of health (SOH) represents a health state of the battery.

FIG. 4 is a table illustrating an example of a charge and discharge time table according to an exemplary embodiment of the present invention.

Referring to FIG. 4, the BMS (270 of FIG. 2) represents a charge and discharge time table that an RTC calendar has. That is, the BMS 270 controls an operation time of the SW2 130 and the SW3 350 according to the charge and discharge time table using a clock that the RTC calendar provides.

The charge and discharge time table includes a battery charge time and a battery discharge time, and an on/off time of the SW2 130 and the SW3 350 is set in the charge and discharge time table.

That is, because the SW2 130 is set to be turned on from 12:00 AM (24:00) to 7:00 AM and the SW3 350 is set to be turned off, it can be seen that the battery charge time is set to 12:00 AM to 7:00 AM. Further, because the SW2 130 is set to be turned off and the SW3 350 is set to be turned on from 7:00 AM to 12:00 AM, it can be seen that a battery discharge time is set to 7:00 AM to 12:00 AM.

Therefore, it is set to perform charge during the night time and to manage the power peak during the day.

Because such a charge and discharge schedule may be in a time table that the user inputs, the battery can be charged or discharged according to the schedule of the time table that the user inputs.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery power supply device, comprising:
   an input unit that receives external power;
   a battery power unit that is connected to the input unit to charge a battery with the external power;
   a current detection unit that detects a load current that is supplied to a load and that provides the load current to the battery power unit; and
   an output unit having one node in which an output terminal of the external power and an output terminal of the battery power unit meet and that provides the external power and direct current battery power from one node of the battery power unit to the load and that receives the load current from the battery power unit to adjust output of the battery power;
   wherein the output unit comprises:
      an inverter that converts direct current battery power to alternating current battery output power and that outputs the alternating current battery output power to the output terminal of the battery power unit; and
      an inverter output control module that receives the load current from the battery power unit through the inverter to calculate consumption power of the load and that adjusts the alternating current battery output power according to the consumption power.

2. The battery power supply device of claim 1, wherein the inverter output control module adjusts the alternating current battery output power according to the load current.

3. The battery power supply device of claim 1, wherein the inverter output control module determines power that is lower than consumption power of the load as the alternating current battery output power within a maximum power limit that the inverter can output.

4. The battery power supply device of claim 3, wherein the inverter output control module determines power within a previously defined ratio of consumption power of the load as the alternating current battery output power within a maximum power limit that the inverter can output.

5. The battery power supply device of claim 1, wherein the input unit comprises:
   a first switch that is connected to the external power; and
   a converter that converts alternating current external power that the external power supplies to direct current external power and that outputs the direct current external power to the battery power unit, and
   the battery power unit comprises:
   the battery that is charged with the direct current external power that the converter outputs;
   a battery management system (BMS) module that is connected to the current detection unit and the inverter and that receives the load current through the current detection unit to provide the load current to the inverter; and
   an external power interception module that is connected to the first switch and the BMS module and that determines on/off of the first switch according to the control of the BMS module to control whether to supply external power.

6. The battery power supply device of claim 5, wherein the input unit further comprises a second switch that is connected to the first switch and the converter,
   the output unit further comprises a third switch that is connected to the battery and the inverter, and
   the battery power unit further comprises:
   a battery charge module that is connected to the second switch, the converter, and the BMS module and that determines on/off of the second switch according to the control of the BMS module to control whether to supply the external power to the converter; and
   a battery output module that is connected to the BMS module and the third switch and that determines on/off of the third switch according to the control of the BMS module to control whether to discharge battery power that is charged at the battery.

7. The battery power supply device of claim 6, wherein the BMS module comprises a real time clock (RTC) chip, determines on/off of the second switch and the third switch according to a previously defined time table, and provides the on/off to the battery charge module and the battery output module, and the previously defined time table comprises a battery charge time and a battery discharge time and sets on/off of the second switch and the third switch according to the battery charge time and the battery discharge time.

8. The battery power supply device of claim 7, wherein the BMS module communicates with external equipment and controls on/off of the second switch and the third switch according to the battery charge time and the battery discharge time according to a request of the external equipment.

9. The battery power supply device of claim 7, wherein the BMS module converts the second switch and the third switch to select battery charge power from one of external power and a photovoltaic (PV) battery, and controls to prevent the battery from being overcharged or overdischarged.

10. A method of controlling power of a battery power supply device that receives a supply of input power from an external power source and that charges a battery with a direct current battery power, the method comprising:
   providing the input power or battery power to a load through one node;
   detecting a current of the load;
   calculating consumption power of the load based on the current of the load;
   converting the direct current battery power to alternating current output power with an inverter; and
   adjusting the alternating current output power to output to the load according to the consumption power.

11. The method of claim 10, wherein the adjusting of the alternating current output power comprises outputting power that is lower than the consumption power of the load as the alternating current output power within a maximum battery power limit that the inverter can output.

12. The method of claim 11, wherein the adjusting of the alternating current output power comprises outputting power within a previously defined ratio of consumption power of the load as the battery power within a maximum battery power limit that can be output.

13. The method of claim 10, further comprising charging, before the providing of the input power, battery power according to a previously set battery charge time and battery discharge time.

* * * * *